Feb. 13, 1951  A. E. MELHOSE  2,541,932
MULTIPLEX SPEECH INTERPOLATION SYSTEM
Filed May 19, 1948  9 Sheets-Sheet 2

INVENTOR
A. E. MELHOSE
BY
Harry C. Hart
ATTORNEY

Feb. 13, 1951     A. E. MELHOSE     2,541,932
MULTIPLEX SPEECH INTERPOLATION SYSTEM
Filed May 19, 1948     9 Sheets-Sheet 3
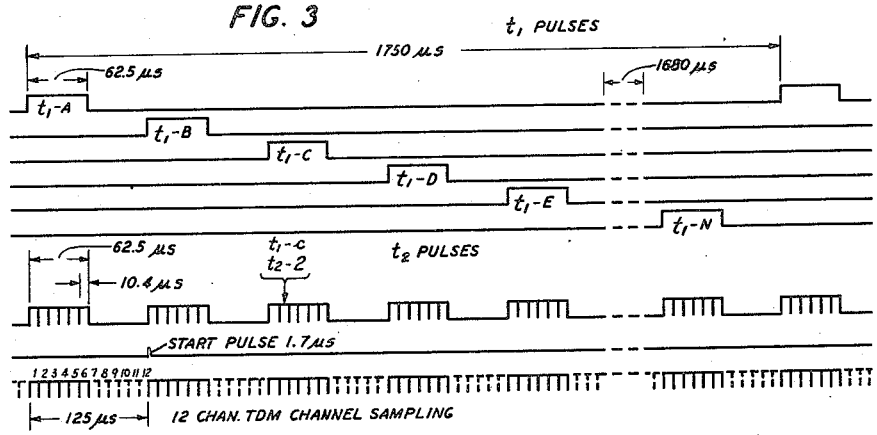
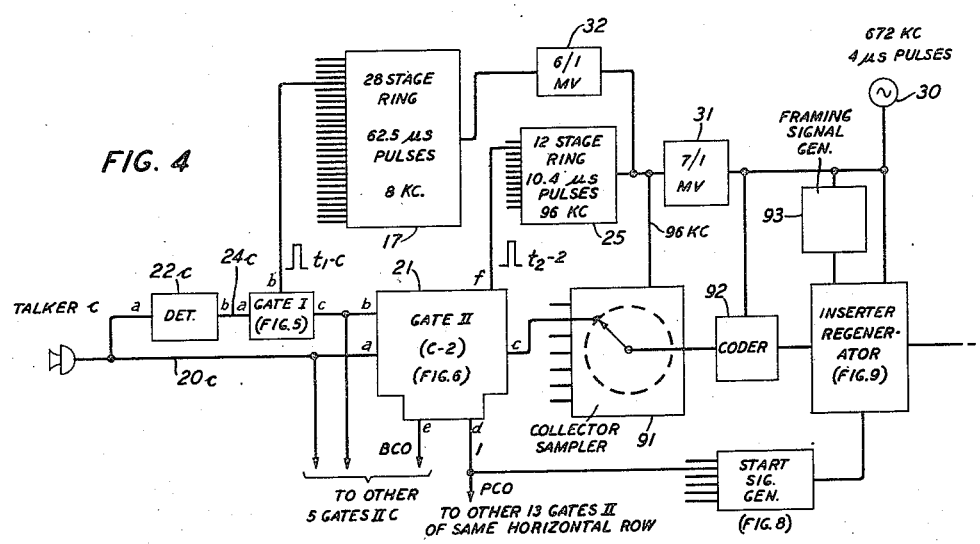
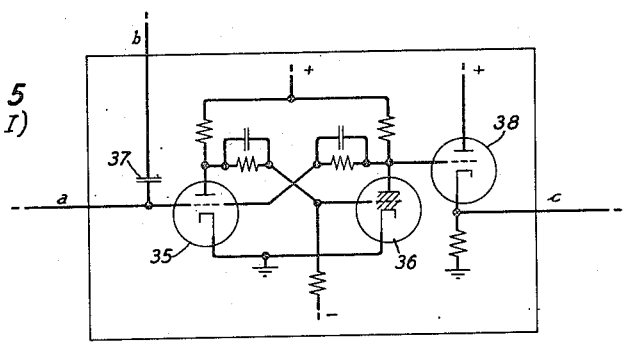
INVENTOR
A. E. MELHOSE
BY Harry C. Hart
ATTORNEY Feb. 13, 1951     A. E. MELHOSE     2,541,932
MULTIPLEX SPEECH INTERPOLATION SYSTEM
Filed May 19, 1948     9 Sheets-Sheet 4
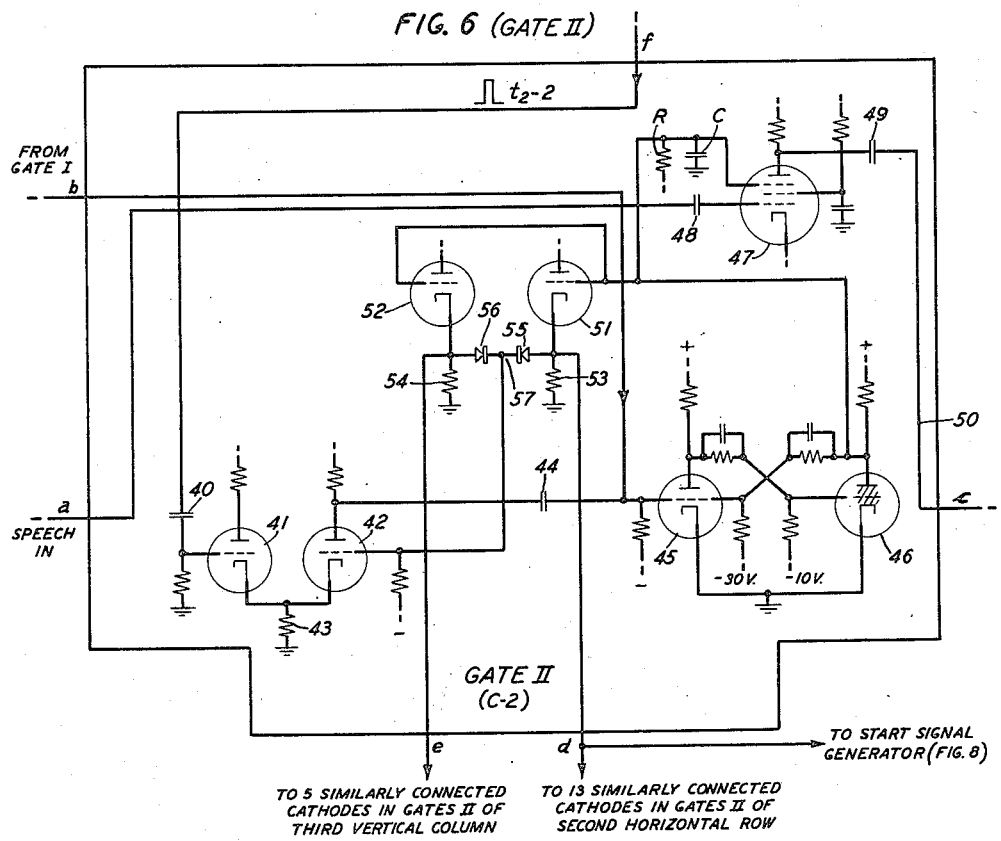
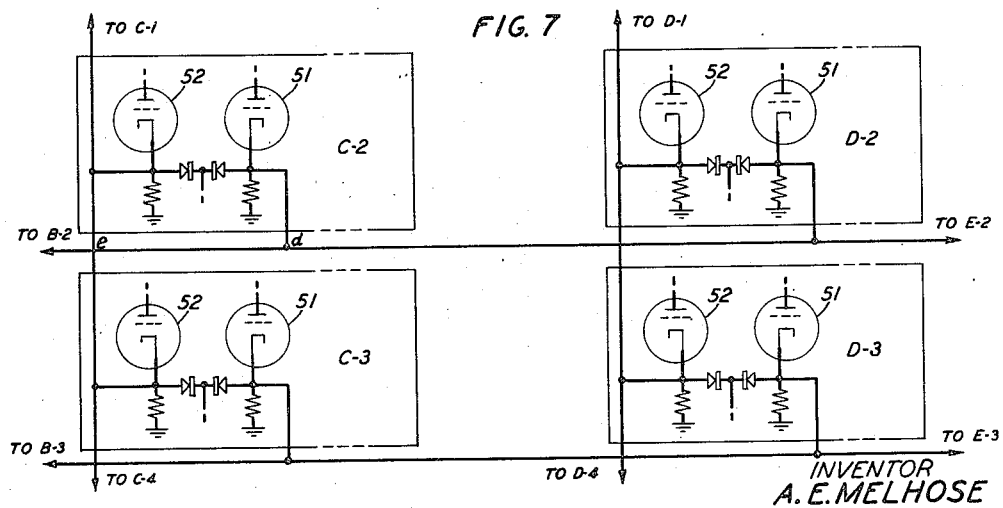
INVENTOR
A. E. MELHOSE
BY
Harry C. Hart
ATTORNEY

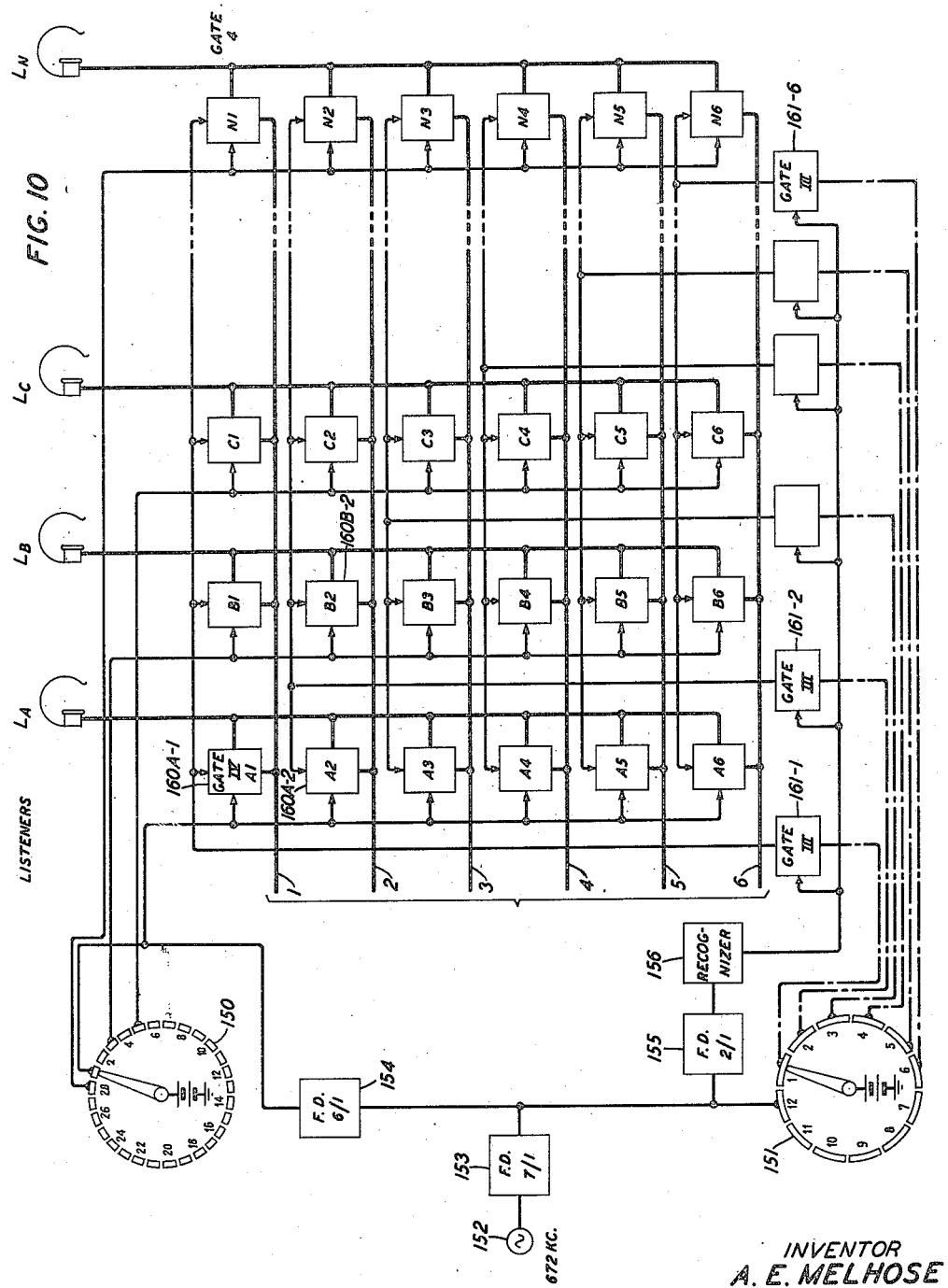

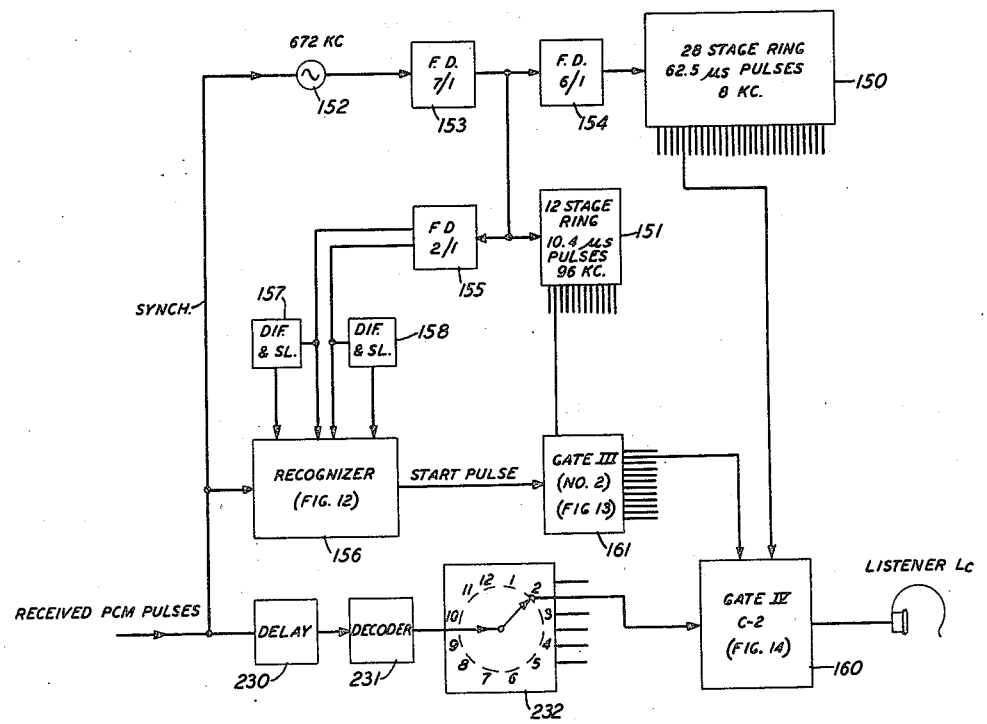
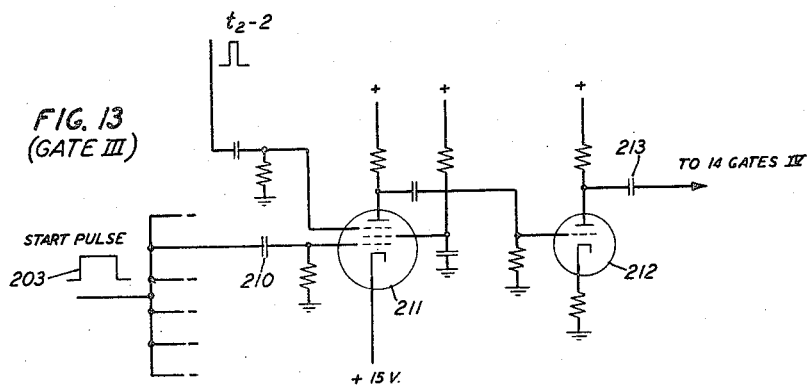

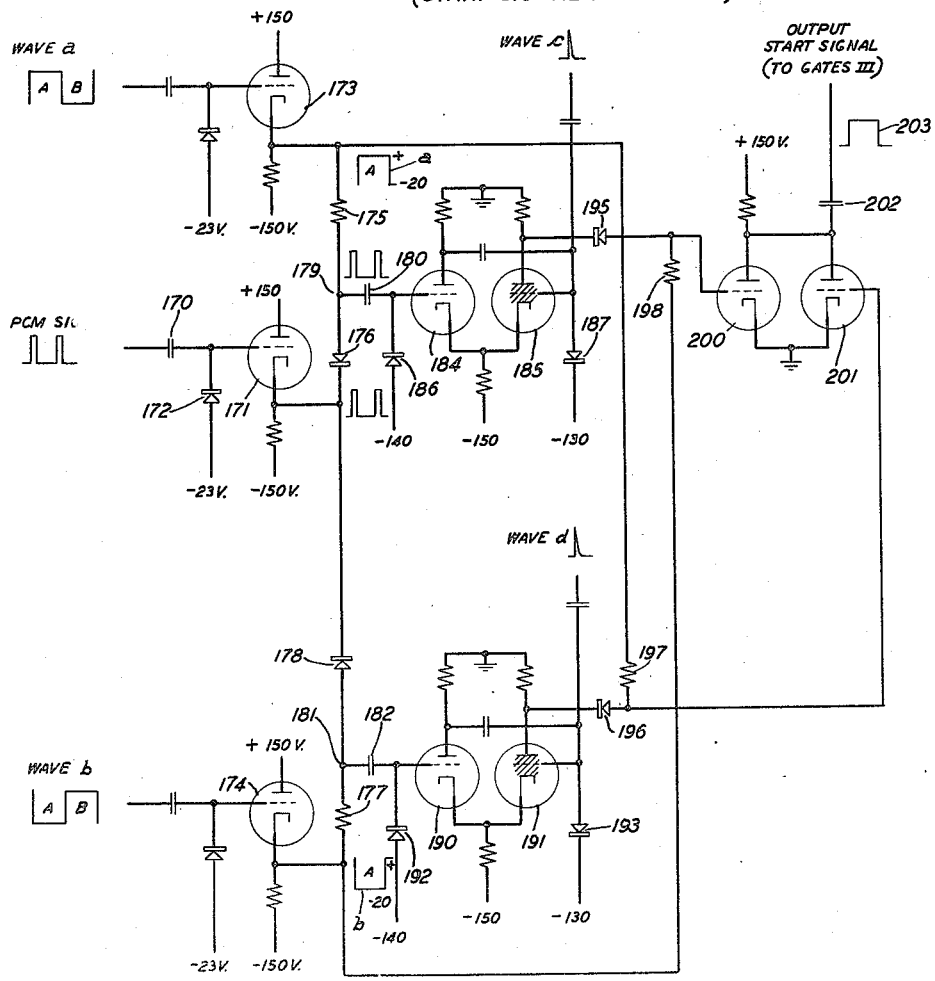

Feb. 13, 1951     A. E. MELHOSE     2,541,932
MULTIPLEX SPEECH INTERPOLATION SYSTEM
Filed May 19, 1948     9 Sheets-Sheet 9
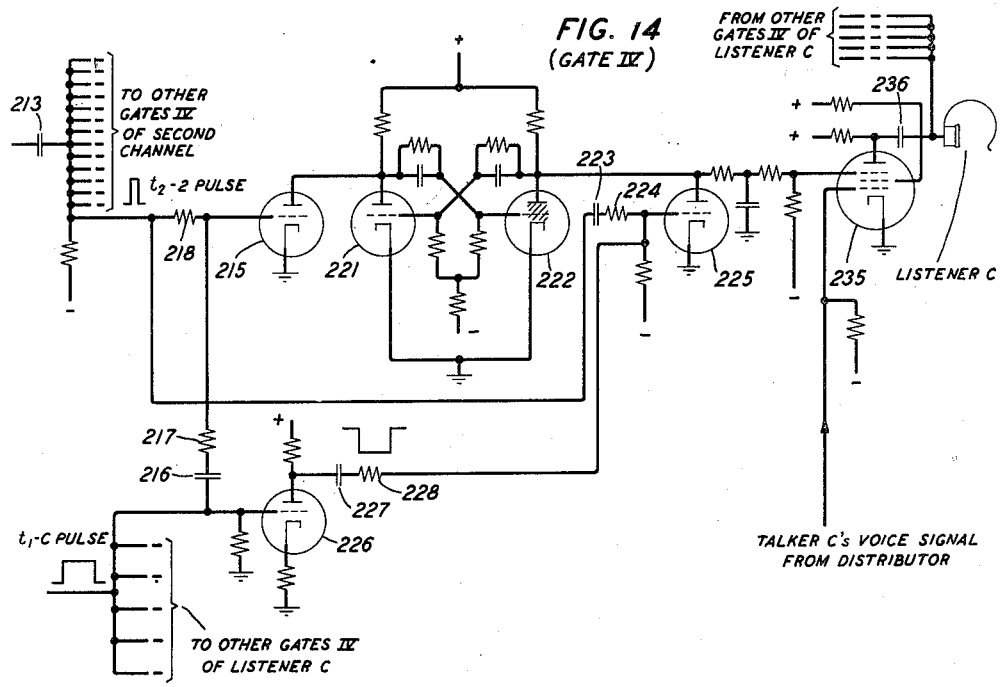
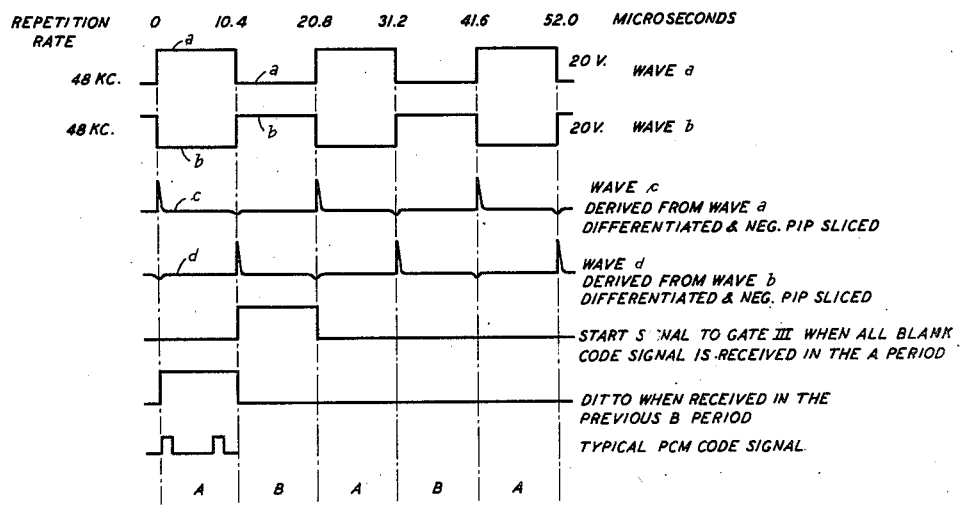
INVENTOR
A. E. MELHOSE
BY
Harry C. Hart
ATTORNEY Patented Feb. 13, 1951

2,541,932

UNITED STATES PATENT OFFICE 2,541,932

MULTIPLEX SPEECH INTERPOLATION SYSTEM

Alfred E. Melhose, Westfield, N. J., assignor to Bell Telephone Laboratories, Incorporated, New York, N. Y., a corporation of New York Application May 19, 1948, Serial No. 27,905

12 Claims. (Cl. 179—15)

This invention relates to multiplex communication, and more particularly to the multiplex transmission of telephone calls.

The principal object of the invention is to provide for the handling of calls originating with a number of independent subscribers by a lesser number of transmission channel facilities, thus reducing the fraction of the time during which a transmission channel would otherwise be idle, and so enabling economies to be effected in the provision of transmission apparatus.

A more specific object is to provide for the handling of the currently active few of a number of independent and potentially active callers, on a time assignment basis.

A still more specific object is to make such provision for a Pulse Code Modulation or other Time Division Multiplex System.

A related object is to make common use of certain apparatus components for Time Division Multiplex purposes and Speech Interpolation purposes.

These and other objects are attained, in accordance with the invention, in the following manner. In a system for handling the calls of N talkers with M channels (M<N), a number MN of gates is provided, each of which corresponds to a particular one of the N talkers and to a particular one of the M channels. It is actuated by the coincidence of three stimuli, namely (a) the occurrence of a first cyclically recurring epoch allotted to this particular talker, (b) the occurrence of a second cyclically recurring epoch allotted to this particular channel, and (c) the activity of the talker in the form of a spurt of speech. Furthermore, these stimuli actuate this gate only when the particular channel is then idle and at the inception of the particular talker's speech spurt. When so actuated, it (a) establishes a speech path from the talker to the channel, which holds until the conclusion of the talkspurt and is then released; (b) prevents the establishment of a similar path from this talker to any other channel; (c) prevents the establishment of a similar path from any other talker to this channel; and (d) initiates a "start" signal which, purely on the basis of the instant within the repetition cycle at which it occurs, identifies both the talker and the channel and so provides information from which the receiver apparatus can route the incoming call to the listener from whom it is intended. At the receiver end of the system, similar apparatus, stimulated by joint occurrence of (a) the start signal, (b) an epoch allotted to the particular listener; (c) an epoch allotted to the particular channel, performs the routing.

It is a feature of the invention that the identification of a particular combination of talker (or listener) and channel is carried out on a pure time assignment basis.

It is another feature of the invention that the several channels are offered in rotation to each of the talkers in turn, so that a given instant in the time constitutes a unique identification of a particular talker and a particular channel—a combination which occurs once and only once in the repetition cycle of the system.

It is another feature of the invention that the time assignment of the several channels for the purposes of the present TASI (Time Assignment Speech Interpolation) system may be identical with that for a TDM (Time Division Multiplex) system with which it is cooperatively related, and that common timing apparatus may be employed to serve both purposes, both at the transmitter end of the system and at the receiver end.

It is still another feature of the invention that the time relations may be assigned, as between the TASI system and the TDM system, in various ways; for example, two TASI systems, each capable of handling the calls of N talkers on M channels, may be interconnected with a single TDM system adapted for transmission over 2M channels. Other numerical relations are equally possible.

The invention will be fully apprehended from the following detailed description of a preferred embodiment thereof, taken in connection with the appended drawings, in which:

Fig. 3 is a wave form diagram of assistance in explaining the operation of the system;

Fig. 4 is a block schematic diagram showing the interconnections among the units of the transmitter apparatus of a TASI system, for a single talker and a single channel;

Figs. 5, 6, 7, 8, and 9 are circuit diagrams showing details of certain of the components of Fig. 4;

Fig. 10 is a block schematic diagram of TASI receiver apparatus;

Fig. 11 is a block schematic diagram showing the interconnections among the units of the receiver apparatus of a TASI system, for a single channel and a single listener;

Figs. 12, 13 and 14 are circuit diagrams showing details of certain components of Fig. 11; and Fig. 15 is a wave form diagram of assistance in explaining the operation of Fig. 12.

Statistical studies of telephone traffic have shown that, during any given telephone call, the facilities are idle the greater part of the time, and that, if a channel were to be assigned to a talker only during the brief talkspurt intervals when the talker is active in the sense that speech sounds are actually being produced, and at the conclusion of the talkspurt were then to be reassigned to another active talker, a given number of channels could handle the calls of a greater number of talkers. Specifically four channels could handle the calls of seven talkers, six those of fourteen, ten those of thirty-two, twelve those of forty, and so on. The invention to be described in detail below provides for such handling of the calls of a number of talkers by the facilities of a lesser number of channels, the assignment of the several channels among the active talkers being carried out on a time basis.

Figure 1:
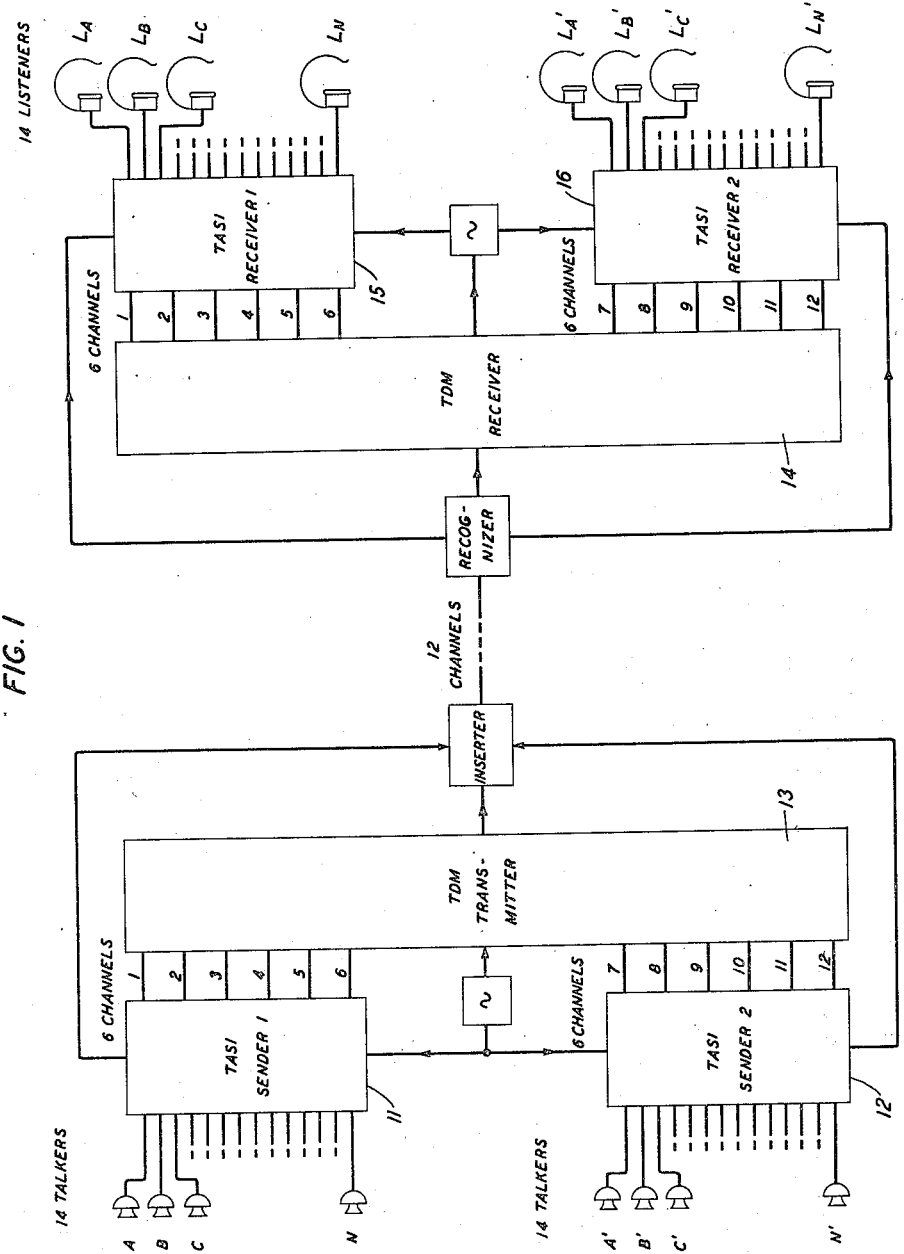
Fig. 1 is a block schematic diagram showing two independent TASI systems, each handling fourteen talkers with six channels, both served by a single twelve-channel TDM system.

It will be apparent from the description which follows that the complexities of the TASI apparatus are considerable. The required apparatus increases in approximate proportion to the product of the number of talkers by the number of channels. Therefore considerations of apparatus economy may dictate a plurality of smaller channel groupings, such as two fourteen-talker-six channel systems; instead of one forty-talker-twelve-channel system, supplying a single twelve-channel Time Division Multiplex system. Thus Fig. 1 is a block schematic diagram showing two fourteen-talker-six channel TASI systems 11, 12 feeding a single twelve-channel TDM system 13 at the transmitter terminal. At the receiver terminal, the twelve TDM channels are first broken down by a TDM receiver 14 into two groups of six, the channels of each group being then sorted and routed by one of the two TASI receivers 15, 16 to the correct listeners among the fourteen of the group. Thus the economies of the systems may be separately treated, while from the standpoint of transmission of information, the interconnection between the systems is entirely satisfactory.

Figure 2:
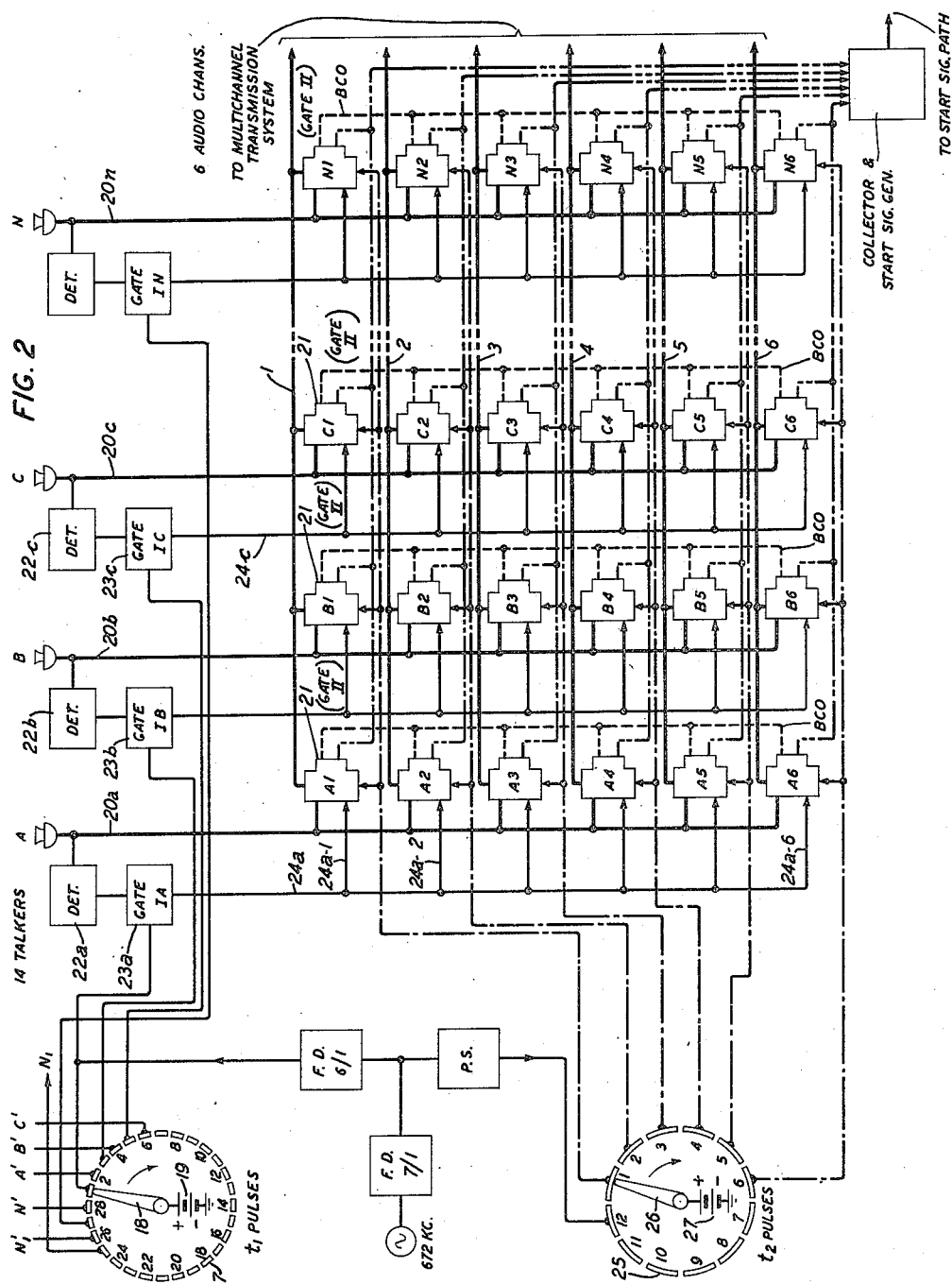
Fig. 2 is a block schematic diagram of TASI transmitter apparatus.

Fig. 2 is a block schematic diagram of one fourteen-talker-six channel (hereinafter designated 14/6) TASI system in which, to avoid excessive complexity, apparatus details are omitted. They will be discussed in connection with the figures to follow. A first pulse distributor having twenty-eight output leads is symbolized in the figure by a commutator 17 of twenty-eight separate segments and an arm 18 which rotates over them and in doing so applies the voltage of a battery 19 to each one in succession. The fourteen odd-numbered segments are associated with one TASI system (the upper one 11 in Fig. 1) while the fourteen even-numbered segments may be associated with another TASI system, for example the lower one 12 in Fig. 1.

The talkers may be considered as being arranged in a horizontal row, and numbered A, B, C . . . N. Each talker is provided with a conventional telephone transmitter, the output conductors 20a, 20b, etc., of the several transmitters defining the vertical conductors of a cross net. The six channels over which these talkers' calls are to be transmitted define six horizontal conductors 1, 2, 3, 4, 5, 6 of the cross net. Associated with each crosspoint of the net is a Gate II 21 which, under precise conditions to be defined, establishes a communication path from a talker to a channel.

The talkers may be conceived of as talking or remaining silent at will, their activity distribution being, and changing, in a random manner. Activity of each talker is recognized by a conventional speech detector 22a, 22b, etc., which continuously monitors that talker's speech and determines whether or not it exceeds a preassigned critical amplitude. If it does, the speech detector 22 gives a steady "on" signal in its output circuit. Otherwise it gives a steady "off" signal. Thus it determines at every instant whether or not the talker is in need of a transmission channel. Voice-operated relay devices having these properties are well known and need no further description.

The output of the speech detector 22 constitutes one input to a Gate I 23. The other input to this Gate I is a train of pulses from one of the odd-numbered segments of the distributor 17. Each Gate I is arranged to deliver an output voltage of standard magnitude when, and only when, it receives inputs concurrently from the speech detector and from the distributor.

Each Gate I is associated with a vertical column of Gates II 21. When the output signal of the Gate I exists, as described in the preceding paragraph, the Gate I delivers it simultaneously to all the Gates II of this column. For example, if the Gate I in question is Gate IA 23a, its output is applied to the Gates II of the first column by way of the conductors 24a, 24a—1, 24a—2, etc. The talker's telephone instrument associated with the same Gate I is also connected by way of the conductor 20a and its branches to all members of this vertical column of Gates II. (Hereinafter the difference between a talker and his instrument will be disregarded.)

A third input to the several Gates II is derived from a second distributor of twelve output leads, symbolized by a twelve-segment commutator 25 having a rotating arm 26 which applies the voltage of a battery 27 to these several leads in succession. Those numbered one to six, inclusive, are associated with the six channels of the present TASI system (the upper one in Fig. 1) while those numbered seven to twelve, inclusive, may be associated with another TASI system, for example, the lower one in Fig. 1. Thus the battery voltage from each particular segment of the lower distributor is applied in the form of a pulse simultaneously to all of the Gates II of one and only one horizontal row associated with one of the channels 1 to 6, inclusive. Thereafter, a similar pulse is applied from the next segment of the lower distributor 25 to all the Gates II of the next horizontal row, and so on to the sixth row. Pulsing of the Gates II of the system shown then pauses while similar operations take place with respect to the lower TASI system 2 of Fig. 1 due to movement of the rotating arm over segments seven to twelve, whereupon the whole cycle of operations is repeated.

It is advantageous to complete the pulsing cycle for all the members of each vertical column of Gates II, corresponding to one talker, before commencing the pulsing of the Gates II of the next column, corresponding to another talker. To this end the pulse outputs of the two distributors may be arranged on the time scale as shown in Fig. 3, where designations "$t_1$" indicate pulses of the talker distributor 17 and designations "$t_2$" indicate pulses of the channel distributor 25. Thus, for example, $t_1$—C designates the pulse of the $t_1$ series which constitutes one of the two inputs to Gate I—C which serves talker C and which in effect, when talker C is active, provides one of the inputs to all six of the Gates II in the third vertical column. As shown in Fig. 3, each of the $t_1$ pulses may be 62.5 microseconds in length, and may be spaced from its neighbors by an equal length of time. The intervening blank spaces may be utilized for similar $t_1$ pulses to serve the other TASI system 2 (the lower one in Fig. 1), being derived from the even-numbered segments of the distributor while the $t_1$ pulses shown may be derived from odd-numbered segments of the distributor.

As shown in the lower part of the figure, each $t_1$ pulse period of 62.5 microseconds is divided into six equal parts, of 10.4 microseconds length. To each of these parts corresponds a single output pulse of the channel distributor 25. The occurrence times of these pulses are designated "$t_2$," a second subscript indicating which one of the first six $t_2$ pulses is meant. Thus $t_2$—2 indicates the $t_2$ pulse which constitutes one of the two inputs to all of the Gates II which serve the second channel 2.

With this pulse distribution every instant of the time scale is uniquely assigned to a particular talker and a particular channel. For example, the instant marked on Fig. 3 by the arrow is assigned by pulse $t_1$—C and by pulse $t_2$—2 to channel No. 2. At this instant all of the Gates II of the third vertical column are partially enabled by the $t_1$—C pulse (if talker C is momentarily active) and all of the Gates II of the second horizontal row are partially enabled by the $t_2$—2 pulse. Thus only one Gate II is enabled in both senses, and this is the Gate II designated "C—2" in Fig. 2. When this Gate II is thus fully enabled, it performs the following functions:

1. The signal path is completed from talker C to channel No. 2, and the particular Gate II is disabled from recognizing later pulses of the $t_2$ train, during the continuance of the talkspurt;

2. All thirteen other Gates II of the same horizontal row are disabled from accepting $t_2$ pulses. This prevents assignment of channel No. 2 to any other talker;

3. All five other Gates II of the same vertical column are disabled from accepting $t_2$ pulses. This prevents assignment of talker C to any other channel; and 4. A "start signal" is generated, whose exact location on the time scale serves as an indication to the receiver by which the particular talker (C) and the particular channel (2) may be identified, so that talker C's call may be correctly routed to listener C.

The apparatus details by means of which these functions may be carried out are shown in Figs. 4, 5, 6 and 7. Referring first to Fig. 4, which is drawn for the condition in which channel No. 2 is made available to talker C, the pulse source shown in Fig. 2 as a commutator 17 may be a twenty-eight-stage ring circuit of which alternate output conductors supply pulses to the several Gates I. The details of such ring circuits may be, for example, as described and shown in an application of E. M. Roschke, Serial No. 793,746, filed December 24, 1947 and issued April 18, 1950, as Patent 2,504,354. In the present example, the sixth stage may be connected to Gate I—C.

The ring circuit must operate in synchronism with another ring circuit 25 of twelve stages, which supplies $t_2$ pulses from its various output terminals to the several rows of Gates II. One way to assure such synchronism is to drive both of them from a common source.

The twelve-stage ring may, if desired, be driven by a basic timing source. In order to tie the TASI system into a TDM system, for example, a PCM (pulse code modulation) system, however, the basic timing source of the PCM system, whose frequency is that of the basic pulse repetition rate, may be made to do double duty. Thus a basic timing source 30 which may include a crystal-controlled oscillator may deliver pulses of 4 microseconds duration recurring at 672 kilocycles per second to an Inserter Unit whose details and functions will be described below; and it may also deliver them to a suitable frequency step-down unit 31 such as a multivibrator of the type described in United States Patent 2,022,969 to L. A. Meacham. The stepdown ratio of this unit may be equal to the number of digits employed in the code. Thus for a seven-digit code which has been found satisfactory, its ratio is 7 to 1. The output pulses of this unit therefore have a recurrence rate of $$\frac{672}{7}$$

or 96 kc./sec. Application of pulses of this frequency to the twelve-stage ring 25 produces output pulses therefrom which recur at this frequency among the several output leads but which, on any one lead, recur at $$\frac{96}{12}$$

or 8 kc./sec.

The 96 kc./sec. pulses are also applied to a $$\frac{6}{1}$$

frequency divider 32 which again may be a multivibrator as disclosed in the Meacham patent referred to above. The output pulse frequency of this unit, namely $$\frac{96}{6}$$

or 16 kc./sec. is now applied to control the twenty-eight stage ring 17. This results in output pulses of the latter which recur at 16 kc./sec. among the several output leads or at 8 kc./sec. as between successive even-numbered output leads but which, on any one lead, recur at $$\frac{8000}{14}$$

or 571 cycles per second.

Correct phase relations among the output pulses of the two ring circuits and the various stepdown multivibrators, as well as among other similar units in other parts of the system, may be assured in any desired way, for example, by a phase coupling as explained in the aforementioned application of E. M. Roschke, and omitted from the drawings to avoid undue complexity.

The operation of the system will now be described in detail under the conditions in which talker A is occupying channel No. 1, talker B is occupying channel No. 6, the remaining talkers are silent, and channels 2 to 5, inclusive, are idle.

Assume now that talker C wishes to talk with listener C (any required switching operations are assumed to have been otherwise taken care of ahead of the system presently being described). In the course of the initial rise of the first spurt of speech from talker C, the speech detector 22c which monitors his voice energy recognizes the fact that his speech level has exceeded a certain preassigned value and gives a steady "on" signal in its output circuit. The speech detector output may consist of a negative steady voltage of 10 volts or so on the output lead 24c during the absence of a talkspurt and zero or positive voltage for the speech "on" condition. Referring to Fig. 5, the "on" signal from the speech detector enters the Gate I–C 23c which may comprise a direct current coupled multivibrator comprising tubes 35 and 36 and having two stability conditions, determined by a negative bias of the order of 20 volts on the grid of the left-hand tube 35. In the "off" condition, the right-hand tube 36 is conducting, the left-hand tube 35 is non-conducting. The positive voltage of the speech detector output is applied to the grid of the tube 35, thereby raising this grid from the negative potential of its bias source toward cut-off. This negative bias of the grid of the left-hand tube is arranged to be greater in magnitude than the speech detector output voltage so that this voltage alone is insufficient to trip the multivibrator. When, however, the third $t_1$ pulse of the series of Fig. 3, namely, the one designated $t_1$—C occurs, it is applied by way of a blocking condenser 37 to the same grid. It has a magnitude of the order of $+10$ volts and, when added to the voltage output of the speech detector, is sufficient to trip the multivibrator to its other stability condition. Immediately, the tube 36 ceases to conduct and its anode potential rises. This anode potential is applied to the control grid of an amplifier, for example a cathode follower 38, whose output is thus a positive voltage which is applied as one of the two control inputs to the Gate II in question, namely, the one shown in block form, Fig. 4, and designated "C-2" in Fig. 2.

At the first instant of the commencement of the $t_1$ pulse in question, no further input signal is applied to this Gate II because, as above assumed, the No. 1 channel is occupied by talker A. However, after the lapse of 10.4 microseconds, the $t_2$ pulse associated with the No. 2 channel occurs and is applied as the other input to the Gate II in question.

Referring to Fig. 6, which shows the circuit details of the Gate II, this $t_2$—2 pulse is applied to Gate II by way of a condenser 40 to the control grid of a tube 41 which is a cathode follower amplifier having a common cathode resistance 43 with the tube 42. The control grid of the latter is biased to hold its cathode slightly above the tube cut-off and the tube therefore acts as amplifier of the output voltage of the tube 41 as it appears on the common cathode resistor 43. It passes this pulse by way of a blocking condenser 44 to the grid of a double stability multivibrator of two tubes 45, 46, the anode of each being coupled by a resistor and a condenser to the control grid of the other. Prior to the arrival of the $t_2$ pulse, this multivibrator is in its quiescent condition in which the left-hand tube 45 is non-conducting and the right-hand tube 46 is conducting. This condition is maintained by a positive bias on the control grid of the right-hand tube which is the resultant of a greater positive voltage from the plate of the left-hand tube overcoming the normal negative bias, and a negative bias on the control grid of the left-hand tube.

The positive voltage output from Gate I is applied directly to the control grid of the left-hand tube 45. The magnitude of this voltage and also the magnitude of the $t_2$ pulse output of the tube 42 are so adjusted that individually neither one is sufficient to cause the multivibrator to change its condition of stability. However, the sum of the Gate I output voltage and the $t_2$ pulse voltage from the tube 42 are sufficient to cause the multivibrator to trip, whereupon the left-hand tube 45 becomes conductive and the right-hand tube 46 becomes non-conductive, allowing its anode potential to rise.

The resulting positive voltage increment from the anode of the right-hand tube 46 performs four functions.

First, the rise in voltage at the anode of the right-hand tube 46 of the multivibrator overcomes the negative bias voltage at the suppressor grid of a tube 47 to whose control grid the voice signal originating with talker C is being applied by way of a condenser 48. Prior to overcoming this bias, the tube 47 constituted substantially an open circuit in the voice path. Operation of the multivibrator 45, 46 to overcome the bias of the suppressor grid of the tube 47, however, enables it to amplify the voice signal and pass it by way of a blocking condenser 49 to the output terminal 50 of the Gate II. This output terminal is connected to the No. 2 channel. The abrupt wave front of the switching voltage from the anode of the tube 46 may be sloped and delayed by the constants C and R in the suppressor circuit to reduce the audio click. Additionally, this same rise in voltage of the anode of the tube 46 is transmitted to the control grid of two cathode follower tubes 51 and 52 which are preferably alike and have individual cathode resistors 53, 54 of like value. Thus the outputs of these two cathode followers are substantially alike in magnitude and sign. The cathodes of these two tubes are interconnected by way of two rectifier units 55, 56, the midpoint 57 of the pair being connected to the control grid of the tube 42. These rectifier units are connected for conduction in the forward direction toward the mid-point 57. Thus a positive voltage is applied to the grid of the tube 42. Its cathode follows, and the cathode of the tube 41 which is directly connected to it rises above cut-off, thus disabling the tube 41 from recognizing further pulses of the $t_2$ train. Thus the particular Gate II is in effect frozen in its condition of connecting talker C with channel 2.

Second, the output voltage of the right-hand cathode follower 51 is applied to all 13 of the Gates II serving the No. 2 channel. All of these Gates II are alike in construction and all contain cathode follower tubes connected in the manner of the tubes 51 and 52, and all fourteen of the cathodes of the right-hand tubes of the Gates II of the second row in Fig. 1 are connected together. This prevents assignment of any talker other than C to channel No. 2.

Third, the output voltage of the left-hand tube 52 is applied in similar fashion to the cathode resistors of similarly connected cathode follower tubes of five other Gates II of the same vertical column. The interconnection of the Gates II for these purposes is shown in Fig. 7.

As a consequence of these connections, the coincidence in time of a voltage applied from Gate I to the grid of the left-hand tube 45 of the multivibrator results in disabling all other Gates II of the third vertical column, thus signalizing the fact that talker C is active and is being assigned a channel, and also in disabling all others of the Gates II of the second horizontal row, thus signalizing the fact that channel 2 is busy. Thus, assignment of talker C to any channel other than No. 2, and assignment of the No. 2 channel to any other talker are both prevented. On the other hand the oppositely poled rectifiers 55, 56 serve to prevent the disablement of another Gate II of the same vertical row from disabling those of the present horizontal row, and vice versa. In addition, while the Gate II has been enabled by the time coincidence of the output of Gate I and the arrival of the $t_2$—2 pulse at the grid of the tube 41, disabling of the tube 41 by application of voltage from the point 57 to the grid of the tube 42 prevents further pulses of the $t_2$ train from in any way altering the situation.

Fourth, the voltage of the cathode of the tube $V_4$ which, as above explained is applied to cut off $t_2$ pulses from the thirteen other Gates II of the same horizontal row is also applied to one input point of a start signal generator (Fig. 8) for use in generating a "start" pulse which is the same for all channels and identifies a particular talker and a particular channel by virtue of the precise instant of the cycle at which it is transmitted.

Figure 8:
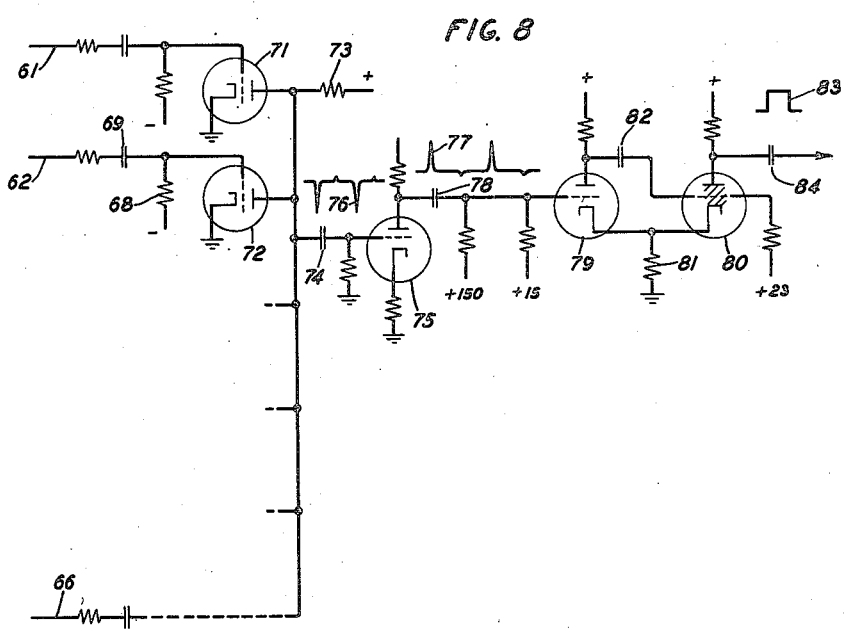
Figure 9:
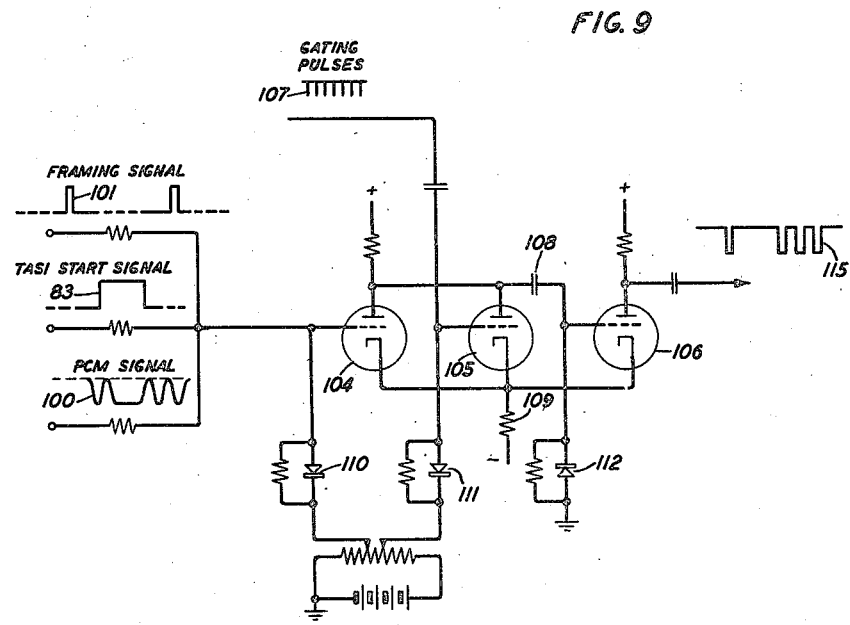

Fig. 8 shows the the circuit details of the start signal generator. This unit has six input points of which the first 61 is connected to all fourteen of the cathodes of the tubes 51 of the Gates II of the first horizontal row, the second 62 to all fourteen of the cathodes of the tubes of Gates II of the second horizontal row and so on through the sixth input point 66. Thus the abruptly rising voltage at the cathode of the tube 51 of the Gate II under consideration is applied to the second input point 62 of the start signal generator, which is connected by way of a resistor 68 and a condenser 69 to the grid of a tube 72 which is biased negatively. The other input points are similarly connected to an RC network and to the negatively biased grid of a tube. The anodes of these tubes are all supplied by way of a common anode resistor 73 from a common potential source. The abruptly rising voltage applied to any of these input points, and in particular to the No. 2 input point 62, is differentiated by the resistor condenser combination, whose elements 68, 69 have appropriate values for this purpose, and passed by way of the anode of the tube 72 and a coupling condenser 74 to the grid of a tube 75 as a negative pip 76 by reason of the phase inverting effect of the tube 72. The tube 75, whose grid is biased somewhat above cut-off, reinverts this pip and passes the signal as a positive pip 77 of about 20 volts amplitude by way of a blocking condenser 78 to the grid of one tube 79 of a single trip multivibrator which comprises two tubes 79 and 80 having a common cathode resistor 81 and a condenser 82 coupling the anode of the tube 79 to the control grid of the other tube 80. As is well known, when suitable biases are applied to the grids, such as +15 volts on the grid of the left-hand tube 79 and +25 volts on the grid of the right-hand tube 80, the quiescent condition of this circuit is that in which the tube 79 is non-conducting and the tube 80 is conducting. Application of the positive pip 77 to the grid of the tube 79 causes the circuit to trip over to its opposite condition of stability in which the tube 79 is conducting, and the anode potential of the right-hand tube 80 rises. The circuit snaps back to the original condition after a time determined by the values of the coupling condenser 82 and the cathode resistor 81. Such single trip multivibrator circuits are well known and are described, for example, in "Time Bases," by O. E. Puckle (Wiley, 1946) pages 58 and 59. The time between the application of the pulse 77 and the self-restoration of the multivibrator is adjusted to 10.4 microseconds. Thus an output pulse 83 is generated. Its duration is 10.4 microseconds and it is initiated by the positive pip 77 whose instant of occurrence is the same as that at which the $t_2$ pulse reached the Gate II as above described. This positive 10.4 microsecond pulse is transmitted by way of the blocking condenser 84 to the inserter (Fig. 9).

Returning now to Fig. 4, the pulse code modulation transmitter, which forms no part of the present invention, comprises a collector 91 which takes samples, in rotation, of the speech energy appearing at its twelve input terminals, and a coder 92 which transforms each of these samples into a 7-digit pulse code group, and delivers the resulting pulse train at its output terminals. In the present case the basic pulse repetition rate is 672 kilocycles per second. With seven pulse positions per sample, any number up to seven of these pulse positions being filled, the successive sample rate is 96 kilocycles per second. With twelve channels in the system, the sampling rate for each channel is therefore eight kilocycles per second, which as above explained is also the rate of transfer from talker to talker in the TASI system. In the ordinary system, the twelve channels connected to the twelve input points of the collector 91 are examined in rotation for activity of the several talkers who are associated with these channels on a one-to-one basis, and the sampling rate is selected as 8 kc./sec. because it is twice the highest voice frequency required to be transmitted. As is well known, with this selection, degradation of speech quality by the sampling process is negligible. When the improvement of the present invention is introduced, the same twelve channels are examined for activity by the same sampler, which activity may now be that of any six of the fourteen talkers A to N for the first six channels and any six of the other fourteen talkers A' to N' for the second six channels.

In order to hold the receiver apparatus in perfect synchronism with the transmitter apparatus, which is required for intelligibility and correct routing of the decoded messages, a suitable framing signal may be generated at the transmitter, under control of the timing source 30 as by a generator 93 and the framing signal may be interspersed among the code pulse groups or otherwise added to the outgoing pulse train. A suitable framing signal and apparatus for generating it at the transmitter and for recognizing and utilizing it at the receiver are described in an application of J. G. Kreer and E. Peterson, Serial No. 776,280, filed September 26, 1947, and issued October 31, 1950, as Patent 2,527,638. The resulting pulse train may then be regenerated prior to transmission, as by slicing pulses at a preassigned level and gating them at preassigned times. Suitable regenerating apparatus based on this principle is described in an application of L. A. Meacham, Serial No. 772,913, filed September 9, 1947, which issued on January 9, 1951, as Patent 2,537,843.

In accordance with the present invention the TASI start signal, developed as described above, is inserted, along with the framing signal, in the PCM pulse train. The insertion of the TASI start signal in the PCM pulse train may be accomplished in many ways, a particularly simple one being to apply the start signal pulse in opposite polarity to the code pulses, to a high impedance point. Thus, referring to Fig. 9, negative PCM pulses 100 from the coder 92, the framing signal 101 from the generator 93, and the positive TASI start signal 83 from the output of the start signal generator of Fig. 8, are all applied to the control grid of a tube 104. This tube has its anode and cathode directly connected to the anode and cathode of a gating tube 105 to whose grid 672 kc. gating pulses 107, from the timing source 30, are applied. A third tube 106 has its cathode directly connected to the cathodes of the first two tubes 104, 105, and its anode is separately supplied, while its grid is coupled to the anode of the tubes 104, 105 by a condenser 108. A single cathode resistor 109 connects all the cathodes to a point of negative fixed potential. Mean potential levels may be stabilized by the use of point contact rectifiers 110, 111, 112, in the grid circuits in the manner shown. In the quiescent condition, one or both of the left-hand tubes 104, 105 is conducting, while the right-hand tube 106 is cut off. As explained in the foregoing application of L. A. Meacham, Serial No. 772,913, this circuit trips from a first condition in which the righthand tube 106 is non-conductive to a second in which it conducts when, and only when, negative pulses are present on the grids of both of the first two tubes 104, 105. When the start signal 82 is present, being of opposite polarity to the PCM signal pulses 100, it masks the latter, and prevents their application to the grid of the first tube 104. The gating pulses 107, applied to the grid of the second tube 105 are insufficient, when alone, to trip the circuit, so that the outgoing train of regenerated pulses 115 contains a blank of 10.4 microseconds or seven pulse positions duration. In case due to differential time delays in various parts of the system the commencement of the blank fails to coincide with the first digit pulse of a code pulse group, this may easily be cured in well-known fashion by the addition of a small time delay either to the PCM pulse train or to the start signal, whichever occurs earlier.

In the foregoing there has been described the establishment of a signal path from talker C to channel No. 2, starting at the inception of his talkspurt, the generation and transmission over the pulse code modulation transmission system of a corresponding suitably chosen start signal, the marking of talker C as active, and the marking of channel 2 as busy. This condition continues as long as talker C's present talkspurt continues. Meantime, similar operations may take place with respect to any of the talkers other than A, B and C, and with respect to any channel other than Nos. 1, 2 and 6, which, under the presently assumed condition, are busy. These operations can be multiplied until all six of the channels are carrying the conversations of six out of fourteen of the talkers A to N, while at the same time all six of the other TASI system (the lower one in Fig. 1) are carrying six conversations of talkers A' to N'.

Now when any talkspurt ceases, the corresponding talker returns to the inactive class and the channel which he has been occupying must be rendered available to another talker. To describe the necessary operations, assume that talker C is the first to cease. On the reduction of the level of his voice below the preassigned threshold at which the speech detector 22c (Fig. 4) recognizes him as active, the speech detector ceases to furnish a zero or positive steady "on" voltage and furnishes instead a steady negative "off" voltage. This negative voltage is applied to the control grid of the tube 35 of the multivibrator of Gate I and returns the multivibrator to its initial condition. Tube 36 of this multivibrator therefore commences to conduct and its anode voltage falls, thereby cutting off the cathode follower tube 38 and removing the positive voltage output of Gate I from the grid of the tube 45 of the multivibrator of Gate II. This multivibrator thereupon returns to its quiescent condition in which the tube 46 is conducting. The anode of this tube 46 therefore falls and so reduces the potential of the suppressor grid of the tube 47 below cut off. This in effect opens the voice current between talker C and channel No. 2. At the same time the negative voltage applied from the anode of the tube 46 to the grid of the cathode follower tube 51 removes the disabling positive voltage from the other thirteen of the Gates II supplied by the $t_2-2$ pulse and the removal of the positive voltage from the grid of cathode follower 52 likewise removes the positive disabling voltage from the other five of the Gates II of the same vertical column. Lastly, removal of the positive voltage from the grid of the tube 42 of the present Gate II removes the positive cathode voltage from the tube 41 and thereby permits the tube 41 once more to receive $t_2$ pulses. Thus, all of the Gates II of the second horizontal row in Fig. 2 and of the third vertical row, including the Gate C-2 in question, are once more enabled to accept speech spurts from other talkers, or a new speech spurt from talker C, whichever occurs earlier.

The receiver apparatus by which calls from each talker are properly routed to the corresponding listener will now be described in connection with Fig. 10. Referring, however, again to Fig. 1, there may be two TASI receivers each arranged to handle incoming calls arriving by way of six channels and intended for any six of fourteen talkers, both associated with a single twelve-channel PCM or other time division multiplex system.

Referring now to Fig. 10, a talker distributor 150 of twenty-eight channels and a channel distributor 151 of twelve channels are provided. Each distributor may comprise a ring circuit similar to that employed at the transmitter. The distributors are symbolized in Fig. 10 as commutators in the same manner as in Fig. 2 for the transmitter. Thus odd-numbered segments of the first distributor 150 are associated with the various listeners LA, LB, LC, etc., of the upper TASI system of Fig. 1, while the first six successive segments of the second distributor 151 are associated with the first six channels 1, 2, 3, etc. of a twelve-channel PCM system. As in Fig. 1, even-numbered segments of the first distributor 150 and the segments numbered six to twelve of the second distributor 151 are associated with the talkers and the channels, respectively, of the second TASI system of Fig. 1. These distributors may be driven by pulses of appropriate frequency derived from a timing source which is held in synchronism by any desired means with the generator at the transmitter. Thus, referring to Figs. 10 and 11 together, a basic timing generator 152 delivers pulses at a repetition rate of 672 kilocycles under control of a synchronizing component of the incoming pulse train to a 7/1 frequency divider 153 whose output pulse rate is thus 96 kilocycles.

The output pulses of this unit in turn drive a 6/1 frequency divider 154 whose output pulses drive the listener distributor 150. The output pulses of the 7/1 divider 153 also drive the channel distributor 151 and in addition, a 2/1 frequency divider 155 which controls a Start Signal Recognizer 156. Referring to Fig. 11, which is drawn for the condition in which a message on channel 2 is routed to listener LC, the listener distributor 150 and the channel distributor 151 may be ring circuits, of twenty-eight stages and of twelve stages, respectively, similar to the corresponding distributors 17 and 25 at the transmitter terminal. The several ring circuits and frequency dividers may be held in proper phase in the manner above referred to in connection with similar apparatus at the transmitter terminal. The pulse output of the talker distributor 150 may consist of a train of fourteen $t_1$ pulses identical with those of the transmitter and similarly spaced apart, and the pulse output of the channel distributor may consist of successive trains, each of six $t_2$ pulses, all the pulses of a train lying within a single $t_1$ pulse interval as in the case of the transmitter. The timing relations illustrated in Fig. 3 apply to the receiver equipment as well as to the transmitter equipment.

The fourteen listeners LA, LB, LC, etc., may be conceived of as being arranged in a horizontal row and the six voice channels in a vertical row. The listeners' lines and the incoming channels thus define a cross net, at each crosspoint of which is a Gate IV 160 whose function it is to route a message arriving on the channel with which it is associated to the listener with which it is associated when, and only when, it is intended for him. This function is accomplished on a time assignment basis in the manner to be described. To this end each Gate IV 160 receives two enabling pulses, firstly a $t_1$ pulse from one segment of the listener distributor 150 and secondly, a $t_2$ pulse by way of a Gate III 161 one of which is associated with each channel from the channel distributor 151. The Gate III, however, supplies its pulses to the Gates IV 160 only when it has in turn been enabled by a Start pulse from a Recognizer 156.

The operation will be described in connection with Fig. 11, in which the frequency dividers and the ring circuit distributors referred to above are shown schematically. The 2/1 frequency divider 155 may have a two-phase output. It may be a multivibrator of two intercoupled triodes, an output lead being taken from the anode of each. The wave forms of these voltages are indicated in curves $a$ and $b$ of Fig. 15. These voltage waves are individually differentiated and sliced by the units 157, 158, to provide the supplementary waves indicated in the curves $c$ and $d$ of Fig. 15. Referring to Fig. 12 which shows the circuit details of the start signal recognizer 156, the incoming train of PCM pulses, which have been combined with framing and synchronizing signals in known fashion and into which the TASI Start signals have been inserted in the manner described above, is applied, after regeneration, amplification and inversion as desired, in the form of a sequence of positive pulses to the Recognizer 156 by way of a condenser 170 to the grid of a cathode follower tube 171. The anode of this tube is connected to a source of positive potential, its cathode resistor is connected to a source of negative potential, and its grid is connected by way of a varistor 172 to a point of intermediate negative potential such as $-23$ volts. The waves $a$ and $b$, derived from the two oppositely phased output points of the 2/1 frequency divider 155 are similarly applied to the grids of similarly connected tubes 173 and 174. The cathode of the tube 173 is connected by way of a resistor 175 and a varistor 176 to the cathode of the tube 171. The cathode of the tube 174 is similarly connected by way of a resistor 177 and a varistor 178 to the cathode of the tube 171. By suitable choice of the tubes 171, 173, 174, the magnitudes of their cathode resistors, and the potential of the sources to which their cathodes and grids are connected, the potentials of these cathodes in the absence of input pulses may have values of $-20$ volts.

The point 179 at which the resistor 175 is connected to the varistor 176 is connected by way of a condenser 180 to the grid of the left-hand tube 184 of a single trip multivibrator of conventional form. This grid is connected by way of a varistor 186 to a point of negative potential, and the grid of the other tube 185 of the single trip multivibrator is connected by way of a varistor 187 to a point of less negative potential. Thus, in the absence of input pulses, the right-hand tube 185 is conducting and its anode is held down in potential. The point 181 which is common to the resistor 177 and a varistor 178 is similarly connected by way of a condenser 182 to the left-hand tube 190 of a similar single trip multivibrator whose cathodes and grids are similarly biased. Thus, in the absence of input pulses, the right-hand tube 191 is conducting and its anode is held down in potential.

If incoming PCM pulses were to arrive at the grid of the tube 171 unaccompanied by the $a$ and $b$ waves at tubes 173 and 174, they would have no effect on the tubes 184 or 190, because under these conditions the varistors 176 and 178 are in their high resistance condition, and the PCM pulses are thus effectively insulated from the grids of the tubes 184 and 190. Likewise, if the waves $a$ and $b$ are applied to the tubes 173 and 174 without the application of PCM pulses to the tube 171, the cathodes of these tubes rise in alternation from $-20$ volts to approximately ground potential, but the associated varistor 176 or 178, as the case may be, is by the same token driven to its low resistance condition so that, again, the grids of the tubes 184 and 190 continue to be held at low potential. But when PCM pulses are applied to tube 171 at the same time as the waves $a$ and $b$ to the tubes $V_2$ and $V_3$, then, during the A period (Fig. 15) when the cathode of the tube 173 is held up, the first PCM pulse of the associated pulse group raises the potential of the cathode of the tube 171, drives the varistor 176 to its high resistance condition, and applies a pulse to the grid of the tube 184 which trips the multivibrator 184, 185 to its other condition of stability, and the anode voltage of the tube 185 rises. This condition holds until the conclusion of the ensuing B period, when this multivibrator is restored to its original condition by the application of a positive pulse of the wave $c$ to the grid of the tube 185. Such restoration is possible because the grid of the tube 184 is no longer held positive by the cathode output of the tube 173, since throughout the B period the $a$ wave at the grid of the tube 173 has its low potential value. By exactly similar action, the occurrence of PCM pulses in the B period trips the multivibrator on the occurrence of the first PCM pulse to arrive, causing the anode potential of the tube 191 to rise.

The anode of the tube 185 is connected by way of a varistor 195 to the grid of a tube 200, and the anode of the tube 191 is similarly connected by way of a varistor 196 to the grid of a tube 201, whose anode and cathode are connected directly to the anode and cathode, respectively, of the tube 200. The wave $a$, as derived from the cathode of the tube 173, is also applied by way of a resistor 197 to the grid of the tube 201 while the wave $b$, as derived from the cathode of the tube 174 is applied by way of a resistor 198 to the grid of the tube 200. The actions of the combination of the resistor 198 with the varistor 195, and of the combination of the resistor 197 with the varistor 196 are similar to the actions of the combinations described above, such as that of resistor 175 and varistor 176, namely, to apply positive voltage to the grid of tube 200 or 201 only when positive voltage is applied by both paths, the varistor and the resistor, and to apply negative voltage to the grid of the tube 200 or 201 when negative voltage is applied by way of either or both of these paths. During the A period, negative voltage is applied by way of the resistor 198 to the grid of the tube 200, and during the B period, negative voltage is applied by way of the resistor 197 to the grid of the tube 201. When PCM pulses are present in the A period, positive voltage is applied from the anode of the tube 185 to the grid of the tube 200. At the commencement of the following B period, positive voltage is applied to the same grid by way of the resistor 198 and this grid rises in potential, to fall again at the conclusion of this B period. By exactly similar action, the potential of the grid of the tube 201 rises at the termination of the B period, to fall again at the conclusion of the following A period. Thus the grids of the tubes 200 and 201 rise and fall in alternation. Since their anodes are connected in parallel, negative voltage remains applied to the output condenser 202 as long as some one or more PCM pulses are present during each A period and each B period.

When, however, a gap in the train of PCM pulses appears, enduring throughout a full sample period of seven pulse positions and representing a Start signal in the A period, then this alternation in the grid potentials of the tubes 200 and 201 is broken. As above explained, the upper single trip multivibrator fails to trip, and the anode of the tube 185 remains negative. At the conclusion of this blank A period, the cathode potential of the tube 174 rises. Now positive voltage is applied by way of the resistor 198 to the grid of the tube 200, but not by way of the varistor 195 so that the grid of the tube 200 remains negative. At this time the grid of the tube 201 is likewise negative. Thus the grids of both of the tubes 200 and 201 are negative, and a positive pulse 203 is transmitted by way of the condenser 202 to the Gates III. This is a Start pulse, coinciding with the duration of a B period and indicating the complete lack of PCM pulses, or the presence of a Start signal, in the preceding A period. What the Recognizer does, in effect, is to examine all successive pulse positions of the PCM pulse group which coincides with the A period and send to Gates III a positive Start pulse when, and only when, it finds no PCM pulses present. Similarly, a total lack of PCM pulses in the B period, and signifying a Start signal at that time, results in holding the potential of the grid of the tube 201 negative during the ensuing A period when the grid of the tube 200 is also negative, and so in sending a Start pulse to the Gates III.

Each of the six Gates III may be a time coincidence gate of any desired configuration, a suitable one being shown in Fig. 13. The start pulse 203 as derived by the Recognizer of Fig. 12 is applied, simultaneously and in parallel, to all six of the Gates III, being applied in each case by way of a condenser 210 to the control grid of a pentode 211, while the pulses of the $t_2$—2 train, derived from the second stage of the twelve-stage ring circuit 151 of Fig. 11, (the second segment of the commutator 151 of Fig. 10) are applied to its suppressor grid. Output pulses, which occur when the $t_2$—2 pulse coincides with a start pulse, are negative at the anode of the pentode 211 and are then reinverted by a buffer amplifier 212 to furnish positive pulses by way of a condenser 213. These are applied in parallel and simultaneously to all fourteen of the Gates IV which are associated with channel No. 2. Similarly, the first of the Gates III, which receives start pulses at its control grid and $t_2$—1 pulses at its suppressor, supplies all fourteen of the Gates IV which are associated with channel No. 1, the third Gate III, which receives start pulses at its control grid and pulses of the $t_2$—3 train at its suppressor, supplies all fourteen of the Gates IV which are associated with channel No. 3, and so on. Thus the function of the several Gates III is to sort the Start pulses as they arrive from the Recognizer in time division multiplex separation on a single conductor, into six groups associated with the six channels and to deliver, in their stead, $t_2$ start pulses which are space separated on the basis of the conductors on which they appear.

Each of the Gates IV, of which, as shown in Fig. 10, there are six for each listener or fourteen for each channel, may be as shown in Fig. 14. Its pulse input point is the control grid of a triode 215 to which $t_2$ pulses from the associated Gate III and $t_1$ pulses from the odd-numbered stages of the twenty-eight stage ring 150 are applied together. Thus, assuming the Gate IV shown in detail in Fig. 14 to be the one designated C-2 in Fig. 10, $t_1$—C pulses are applied by way of a condenser 216 and a resistor 217 to the grid of the tube, and similarly to the five other Gates IV serving listener C, while the $t_2$—2 pulses are applied by way of a resistor 218 to the same grid and similarly to the thirteen other Gates IV served by channel No. 2. The anode of the tube 215 is directly connected to the anode of tube 221 of a multivibrator. The $t_2$—2 pulses are also applied by way of a condenser 223 and a resistor 224 to the grid of a tube 225, while the $t_1$—C pulses are also applied to the grid of an inverter tube 226 and thence after inversion to the grid of the tube 225 by way of a condenser 227 and a resistor 228. The anode of the tube 225 is directly connected to the anode of tube 222 of the multivibrator. Thus, when a $t_2$—2 pulse from Gate III, signifying a Start signal, occurs within the period of a $t_1$—C pulse, the two are applied in like phase to the grid of the tube 215 and in opposite phase to the grid of the tube 225.

It is the function of Gate IV (C-2) to establish a voice path from channel 2 to listener LC when the arrival of a Start signal in the proper time slot indicates that a message destined for listener C is about to commence on channel 2; and to disestablish this connection when a Start signal in any other time slot indicates that channel 2 is to be assigned to some other listener. Returning to consideration of Fig. 11 and the original incoming PCM pulses, after such regeneration and amplification as may be required, these are first delayed by 10.4 microseconds by a suitable delay device 230 to compensate for the lag of 10.4 microseconds introduced by the Recognizer, whereupon they are supplied to decoder apparatus 231 which reconverts them from the code representation used in transmission into voice signal samples. The latter are then applied to a distributor 232 which routes them into twelve lines in rotation, of which the first six are those of the upper TASI system of Fig. 1 while the second six are those of the lower TASI system of Fig. 1. The voice signal samples on the second line are applied to the control grid of a tube 235 of Fig. 14, the anode of which is connected by way of a condenser 236 to listener C's instrument. Thus the required voice path is established from channel No. 2 to listener LC by way of the tube 235 when and only when this tube conducts. Control of its conduction is effected by the application to its suppressor grid of the voltage output of tube 222 of the multivibrator.

The manner in which the apparatus of Fig. 14 operates to apply the required voltage to the suppressor grid of the tube 235 to secure the required result will be described with respect to the condition in which talker A is engaging listener LA by way of channel No. 1, channel No. 6 is similarly occupied by talker B and listener LB, channel No. 2 has recently been occupied by some talker other than A, B and C, and is now required by talker C who wishes to converse with listener LC. Thus, prior to the arrival of the C-2 Start signal, the C-2 Gate IV is in its inactive condition, the right-hand tube 222 of the multivibrator is conducting, its anode potential is low, and the voice gate tube 235, to whose suppressor grid this potential is applied, is cut off. The left-hand tube 221 of the multivibrator is cut off and its anode potential is high. Application of this potential to the anode of the tube 215 places this tube in readiness to accept incoming pulses. Thus, upon the time coincidence of the $t_2$—2 start pulse with the $t_1$—C listener pulse, the grid potential of the tube 215 is raised to the point at which conduction takes place. The resulting pulse at the anode of the tube 215 is applied to the grid of the right-hand tube 222 and trips the multivibrator to its other condition of stability in which the tube 222 is cut off, raising the potential of the suppressor grid of the tube 235 and establishing the required voice path from channel No. 2 to listener C. At the same time the tube 221 becomes conducting and its anode potential falls. Application of this anode potential to the anode of the tube 215 immunizes the tube 215 against operation by subsequent $t_2$—2 pulses and subsequent $t_1$—C pulses, either of which may occur before the conclusion of talker C's speech spurt.

This condition holds until talker C's speech spurt has been completed and continues to hold thereafter until a demand is made for channel No. 2 by some other talker. When this occurs, the appropriate Gate IV operates as described above, and the C-2 Gate IV under consideration is disabled by the occurrence of a $t_2$—2 start pulse which does not coincide with a $t_1$—C pulse. In the absence of a $t_1$—C pulse, the $t_2$—2 pulse is applied alone to the grid of the tube 215, but this is of insufficient amplitude to cause conduction, and furthermore the tube has been disabled as described above. The $t_2$—2 pulse is also applied to the grid of the tube 225. The $t_1$—C wave, inverted by the tube 226, consists of a negative potential during the pulse, which thus prevents conduction of the tube 225 when a start pulse coincides with a $t_1$—C pulse, and of a positive potential at all other times. When, therefore, a $t_2$ start pulse arrives which falls outside of the limits of a $t_1$—C pulse, and which therefore indicates that channel No. 2 is in demand for some other listener, the tube 225 delivers a negative output pulse to the grid of the left-hand tube 221 of the multivibrator which drives this tube below cut-off and restores the multivibrator to its original condition of readiness, also interrupting the transmission path through tube 235.

In a binary permutation code system for the transmission of voice signals such as the one with which the present TASI system is combined, the various signal amplitude values may be represented by numbers extending, in the seven-digit code, from 0000000 to 1111111. In such a system it is normal to bias the apparatus to the center of this range, so that the former symbol represents maximum peak signal amplitudes of one sign and the latter represents maximum signal peak amplitudes of the other sign. Of all possible amplitudes, these two occur with the greatest rarity in the course of a normal voice signal. Therefore a minimum of degradation of the signal results when one of them is selected as the Start signal. As between these two there is no choice, and by simple modification of the Start signal generator at the transmitter terminal and of the Recognizer at the receiver terminal, the other could have been chosen as a Start signal. Still other variations of the Start signal, and of the generator and Recognizer, as well as of the circuit details of other apparatus components, are possible.

What is claimed is:

1. In a speech transmission system, a terminal station, a number of transmitters at said station, a lesser number of communication channels outgoing from said station, a first uniformly rotating distributor for offering all of said channels in rotation to a first one of said transmitters, a second uniformly rotating distributor for substituting all others of the transmitters, in rotation, for the first transmitter, talkspurt-operated means for establishing a connection from an active transmitter to an idle channel at the instant at which such channel is offered to such transmitter, and other talkspurt-operated means for removing a busy channel from the group of channels offered to other transmitters during the continuance of a talkspurt.

2. In a speech transmission system, a terminal station, a number of transmitters at said station, a lesser number of communication channels outgoing from said station, a first uniformly rotating distributor for collecting speech energy from all of said transmitters in rotation, a second uniformly rotating distributor for supplying speech energy to all of said channels in rotation, common driving means for driving said distributors at speeds such that all of said channels are offered in rotation to each of said transmitters in rotation, talkspurt operated means for establishing a connection from an active transmitter to an idle channel at the instant at which such channel is offered to such transmitter, and other talkspurt-operated means for removing a busy channel from the group of channels offered to other transmitters during the continuance of a talkspurt.

3. In a speech transmission system, a terminal station, a number of transmitters at said station, a lesser number of communication channels outgoing from said station, uniformly rotating means for offering all of said channels in rotation to each of said transmitters in rotation, talkspurt-operated means for causing an active transmitter to which such offer is made to seize the first idle one of said channels, to hold it for speech transmission for the duration of a talkspurt and then to release it, talkspurt-operated means for preventing an inactive transmitter from seizing another line, and talkspurt-operated means for preventing the seizure of a busy line by any transmitter.

4. In a speech transmission system, a terminal station a number N of transmitters at said station, a lesser number M of lines outgoing from said station, a first distributor for collecting speech energy from all N of said transmitters in rotation, a second distributor for presenting all of said lines in rotation to each transmitter, voice-operated means connected to each transmitter, serving in combination with said first distributor to identify a number $n$ of active transmitters, up to but not exceeding M, and serving in combination with said second distributor to establish a connection from each active transmitter to an idle line, voice-operated means for preventing the seizure of any busy line by a transmitter, means for sampling the messages in said M lines in rotation and for producing code pulse groups representative of said samples, means for translating the location on the time scale at which an active transmitter seizes an idle line into a special code pulse group, means for combining said special code pulse group with said sample-representing code pulse groups, and means for transmitting all of said pulse groups to said second terminal.

5. In a communication system, a plurality N of incoming conductors, a lesser plurality M of outgoing conductors, means for distributing pulses of $t_1$ duration among the incoming conductors in rotation, means for distributing pulses of $t_2$ duration among the outgoing conductors in rotation, where $$t_2 = \frac{t_1}{M}$$

a number MN of gates, of which M are associated with each incoming conductor, and N are associated with each outgoing conductor, each of said gates identifying one particular incoming conductor with one particular outgoing conductor, means for establishing a transmission path by way of one of said gates from one of said incoming lines to one of said outgoing lines, means for enabling each of said gates upon the temporal coincidence of the $t_1$ pulse distributed to its incoming line, of the $t_2$ pulse distributed to its outgoing line, of activity in the incoming line and of inactivity in the outgoing line, means for generating a start pulse upon the joint occurrence of said four conditions, means for sampling signal energy appearing on said outgoing lines in rotation, means for translating each sample into a permutation code pulse group, means for transmitting said pulse groups in time sequence, and means for inserting said start pulse in said sequence.

6. In a communication terminal station, a plurality N of receivers, a lesser plurality M of incoming lines, a first distributor for distributing pulses of $t_1$ duration among the receivers in rotation, a second distributor for distributing pulses of $t_2$ duration among the lines in rotation, where $$t_2 = \frac{t_1}{M}$$

means for operating said distributors in synchronism with similar apparatus at a transmitter terminal, means for translating incoming code groups of pulses into signal amplitude samples, means for distributing said samples among said lines in rotation, means for recognizing a code pulse group of a preassigned permutation code character as a start pulse, and means for establishing a voice path from an incoming line to a receiver upon the temporal coincidence of a $t_1$ pulse distributed to said receiver, a $t_2$ pulse distributed to said line, and a recognized start pulse.

7. In a speech transmission system, a first terminal, a second terminal, a number N of transmitters at said first terminal, an equal number of receivers at said second terminal, a lesser number M of time division multiplex channels interconnecting said terminals, means at said first terminal for assigning periods of $t_1$ duration to said transmitters and periods of $t_2$ duration to said channels, speechspurt operated means at said first terminal for establishing a communication path from an active transmitter to an idle channel at an instant uniquely related to the $t_1$ period assigned to said transmitter and to the $t_2$ period assigned to said channel, synchronously operated means at said second terminal for assigning like $t_1$ periods to said receivers and like $t_2$ periods to said channels, means at said first terminal for generating a start signal at an instant uniquely identifying a particular $t_1$ period and a particular $t_2$ period, and start-signal-operated means at said second terminal for establishing a communication path between a channel identified by said $t_2$ period and a receiver identified by said $t_1$ period.

8. In a speech transmission system, a first terminal, a second terminal, a number N of transmitters at said first terminal, an equal number of receivers at said second terminal, a lesser number M of time division multiplexed channels interconnecting said terminals, means at said first terminal for allotting idle channels to active transmitters in cyclic serial order and for generating a start signal each time such an allotment is made, and, at said second terminal, means controlled by said start signal for making like allotments of said channels to said receivers.

9. In a system for distributing a number M of speech signals originating in a greater number N of transmitters among a number M of transmission channels, the method which comprises examining all transmitters in rotation for activity, examining all channels, in rotation, for occupancy, applying a number M of active transmitters to said channels in rotation at a rate equal to twice the highest message frequency, translating the message energy so applied to said channels into message code pulse groups, translating the location on the time scale at which a particular transmitter is applied to a particular channel into an identification code pulse group, and transmitting all of said code pulse groups to a receiver station on a Time Division Multiplex basis.

10. In a speech transmission system, a transmitter terminal, a receiver terminal, two similar sets of Time Assignment Speech Interpolation Transmitter Apparatus at said transmitter terminal, each adapted to handle the calls originating in a number N of transmitters by way of a lesser number M of channels, corresponding receiver apparatus at said receiver terminal, a time division multiplex transmission system of 2M channels interconnecting said terminals, and means at said transmitter terminal for supplying to said transmission system energy on each of the M channels of the first set in rotation and for thereupon supplying to said transmission system energy on each of the M channels of the second set in rotation, whereby a full revolution of both sets constitutes a full revolution of the transmission system.

11. In a system for transmitting signals originating in a number N of transmitters to an equal number of receivers by way of a lesser number M of channels on a time division basis, a number N of transmitters, a first group of N conductors arranged in one direction, each coupled to a transmitter, a second group of M conductors arranged in a perpendicular direction, each coupled to a channel, said first and second groups together defining a cross-net, a first pulse distributor coupled to the transmitters, a speech detector coupled to each transmitter and to each conductor of the first group, a first group of gates one of which is coupled to each transmitter and to each conductor of the first group, each of said gates delivering an output signal only upon the simultaneous receipt of two input signals from different sources, each speech detector furnishing one such signal, when its transmitter is activated, to partially enable one of said gates, said distributor furnishing pulses to the gates of said first group in sequence, said last-named pulses serving as the second-named input signals to said gates and so operating to complete the enablement of a gate of said first group which has been partially enabled by the signal furnished by the speech detector, a second group of gates, NM in number, one coupled to the first group conductor and to the second group conductor which define each crosspoint of said net, each gate of said first group, when fully enabled, furnishing a signal to all M of the gates of the second group which are coupled to that conductor of the first conductor group to which said last-named first group gate is coupled, a second pulse distributor coupled to the channels and furnishing pulses to the several channel groups of the gates of the second group in rotation to complete the enablement of each second group gate which has been partially enabled by a first group gate, each second group gate, when fully enabled, being operative to establish a speech path from that first group conductor to which it is coupled to that second group conductor to which it is coupled, and to disable all other second group gates serving the same transmitter and all other second group gates serving the same channel.

12. In a speech transmission system, a terminal station, a first apparatus at said station comprising a first set of transmitters, N in number, a first set of outgoing lines, M in number, M being less than N, a first distributor for collecting speech energy from all of said transmitters in rotation, a second distributor for supplying speech energy to all of said lines in rotation, common driving means for driving said distributors at uniform speeds such that all of said lines are offered in rotation to each of said transmitters in rotation, talkspurt-operated means for establishing a connection from an active transmitter to an idle line at the instant at which such line is offered to such transmitter, other talkspurt-operated means for removing a busy line from the group of channels offered to other transmitters during the continuance of a talkspurt; and a second apparatus at said station comprising a second set of transmitters, N in number, a second set of outgoing lines, M in number, M being less than N, a third distributor for collecting speech energy from all of the transmitters of said second set, in rotation, a fourth distributor for supplying speech energy to all of the lines of said second set in rotation, common driving means for driving said third and fourth distributors at uniform speeds such that all of the lines of the second set are offered in rotation to each of the transmitters of the second set in rotation, talkspurt-operated means for establishing a connection from an active second set transmitter to an idle second set line at the instant at which such line is offered to such transmitter, and other talkspurt-operated means for removing a busy second set line from the set of lines offered to other transmitters of the second set during the continuance of a talkspurt; a common time division multiplex transmission system of 2M channels coupled to the outgoing lines of said first and second sets and operative in synchronism with said distributors, and means at said terminal station for supplying to said transmission system energy on each of the M lines of the first set in rotation and for thereupon supplying to said transmission system energy on each of the M lines of the second set in rotation, whereby a full revolution of both sets constitutes a full revolution of the transmission system.

ALFRED E. MELHOSE.

REFERENCES CITED

The following references are of record in the file of this patent:

UNITED STATES PATENTS

| Number | Name | Date |
|---|---|---|
| 1,595,735 | Schmierer | Aug. 10, 1926 |
| 1,905,359 | Affel | Apr. 25, 1933 |
| 2,103,481 | Mathes | Dec. 28, 1937 |
| 2,149,646 | Voss | Mar. 7, 1939 |
| 2,205,406 | Holcomb | June 25, 1940 |
| 2,273,193 | Heising | Feb. 17, 1942 |
| 2,277,192 | Wilson | Mar. 24, 1942 |
| 2,301,223 | Mitchell | Nov. 10, 1942 |
| 2,317,471 | Meacham | Apr. 27, 1943 |
| 2,388,001 | Loughren | Oct. 30, 1945 |
| 2,395,467 | Deloraine | Feb. 26, 1946 |
| 2,423,466 | Peterson | July 8, 1947 |
| 2,434,989 | Christian | Jan. 27, 1948 |
| 2,438,908 | Goodall | Apr. 6, 1948 |
| 2,464,607 | Pierce | Mar. 15, 1949 |
| 2,465,355 | Cook | Mar. 29, 1949 |
| 2,478,409 | Loughlin | Aug. 9, 1949 |